Oct. 30, 1956   W. S. RADUNE   2,768,467
HOOK-SETTING DEVICE FOR FISHING TACKLE
Filed April 10, 1956

INVENTOR.
WILLIAM S. RADUNE
BY
Teller + McCormick
ATTORNEYS

United States Patent Office 2,768,467
Patented Oct. 30, 1956

2,768,467

HOOK-SETTING DEVICE FOR FISHING TACKLE

William S. Radune, Berlin, Conn.

Application April 10, 1956, Serial No. 577,342

3 Claims. (Cl. 43—43.1)

This invention relates to an improvement in fishing tackle and, more particularly, to an improved device for automatically setting the hook when a fish takes the bait or lure.

Generally similar devices have been provided for the same purpose, i. e., there have been devices provided which will operate automatically as the result of a "tug" on the bait or lure to resist the fish and automatically set the hook when the bait is taken. However, such devices have been relatively complex in make-up and are expensive to manufacture. It is the general object of this invention to provide a hook-setting device which is characterized by its simplicity, which is economical to manufacture and which uses a minimum of parts, but which, nonetheless, is sturdy, dependable and foolproof in operation.

Other, more specific objects as well as advantages of the invention will become apparent to those skilled in the art from the following description having reference to the annexed drawing wherein, by way of preferred example only, one specific embodiment of the invention is shown.

Figure 1:
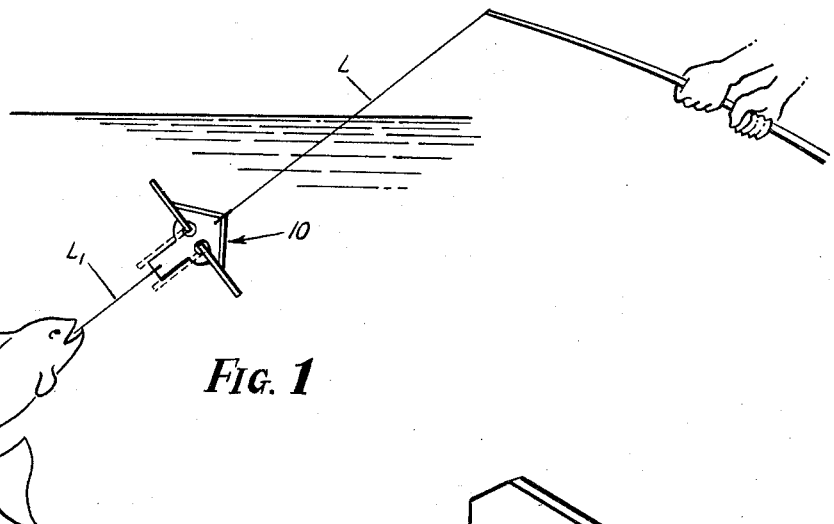
Fig. 1 is a view showing the hook-setting device as it is used.

As mentioned previously, generally similar devices have been provided for setting the hook as a result of a fish taking the bait. As far as I am aware, such devices have been incorporated in the construction of a float or bobber attached to the fishing line to ride or float on the surface of the water. One novel aspect of my device is that it is adapted to be attached to the fishing line so that it will ride beneath the surface of the water. To this end, I preferably construct my device of transparent plastic material and by preference, the device is not colored. However, other materials can be used in the construction of the hook-setting device and the device can be colored if desired. As shown in Fig. 1, the hook-setting device 10 is secured to a fishing line L in spaced relationship to the bait or lure which can be attached to the device as by a leader or the like L1.

The hook-setting device comprises three essential elements, namely, a body member 12 and a pair of wings 14, 14 which are pivotally connected to the said body member. The body member 12 is shaped and formed generally like a flat arrow having a pointed head 16 the tapering edges of which are preferably beveled. Two notches 18, 18 are formed in the body member 12 at each side of its shank 20 adjacent the head 16. More specifically, the notches 18, 18 in each case comprise a substantially straight slot 22 cut from the rear edge of the head 16 and extending forwardly therein and toward the longitudinal center line of the body member 12. Each straight slot 22 extends substantially tangentially into a generally circular opening 24 formed about a center lying substantially at the point of intersection between the lines along the adjacent longitudinal edge of the shank 20 and the rear edge of the head 16. A parti-circular shoulder 26 is formed substantially concentric with the opening 24 and extends from the shank 20 to the slot 22.

The wings 14, 14 are flat polygonal plates which are pivotally connected to the body 12 in the notches 18, 18. More specifically, each plate 14 is provided with a substantially rectangular opening 28 adjacent its inner edge 30 and said rectangular opening receives a parti-circular shoulder 26. As a result, each wing 14 is pivoted within the circular opening 24 of the notch 18 in the manner best shown in Figs. 2 and 3. Each wing 14 is inserted within its respective notch 18 by thrusting its inner edge through the straight slot portion 22 of the said notch, the said slot portion being sufficiently wide to accommodate the thickness of the wing or plate 14. After the inner edge is thrust into the circular portion 24 of the notch 18, the generally rectangular opening 28 in the wing will receive the parti-circular shoulder 26 in sliding relationship so that the said wing 14 can pivot therearound. Thus, it will be seen that each shoulder 26 provides a hook upon which a wing 14 is pivoted.

Figure 2:
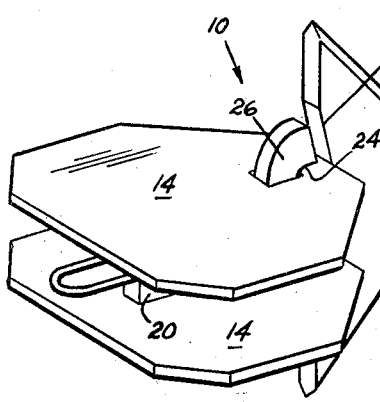
Fig. 2 is an enlarged perspective view showing the pivoted wings incorporated in the structure in folded position, as will be the case when there is no force applied to the bait or lure opposing the line force of the fisherman.
Figure 3:
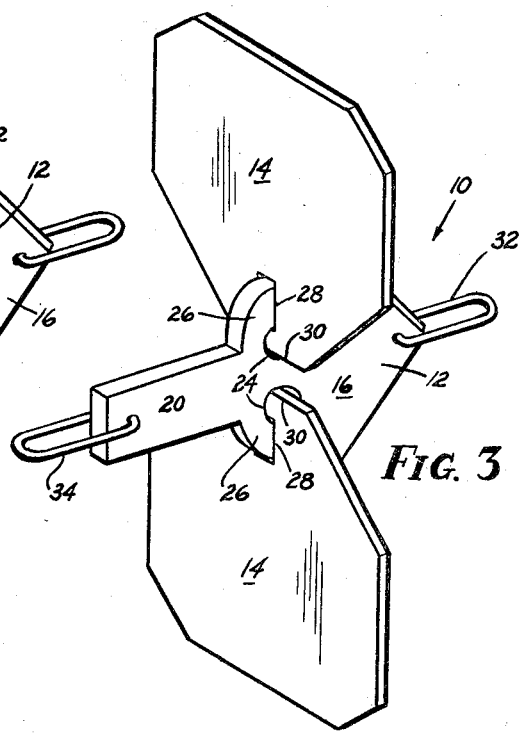
Fig. 3 is a view similar to Fig. 2 showing the wings spread as will occur when a fish tugs at the bait or lure.

In order that the hook-setting device 10 can conveniently be operatively connected to the fishing line L and to the leader L1, a link 32 is connected adjacent the forward tip of the head 16 of the body member 12 for connecting the line L and a similar link 34 adjacent the end of the shank 20 for connecting the leader L1. In operation, force applied to the fishing line by the fisherman will drag the hook-setting device through the water and beneath its surface with the wings 14, 14 in folded position as shown in Fig. 2. It will be observed that the arrow shape provides a streamlined configuration to the device so as to reduce drag on the fishing line. When a fish takes the bait to tug at the device 10 through the leader L1, movement of the device through the water causes the wings 14, 14 to spread to the position shown in Figs. 1 and 3. In the spread position of the wings, the device offers great resistance or drag automatically to provide an opposing force to the fish thereby automatically to set the hook.

Figure 4:
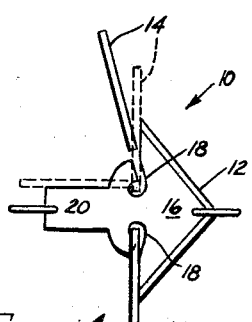
Fig. 4 is a small scale view showing the manner in which the wings are attached to the body portion of the hook-setting device.

It is important to observe that in the usual operation of the device as set forth above, the wings 14, 14 will not become detached from the body 12. That is, the wings pivot in the notch 18 between the two broken line positions as shown in Fig. 4 and do not register with the straight slot 22 of the said notch so as to be withdrawn therefrom. In any event there is no force applied to the wings sufficient to withdraw them through the slots 22, 22. It is only when force is applied to the wings 14, 14 that they can be inserted through the slots 22, 22 or withdrawn therefrom.

I claim as my invention:

1. A hook-setting device adapted to be connected in a fishing line in spaced relationship to the bait and comprising in combination, a flat generally arrow-shaped body member including a shank and a head pointing away from the bait, the said body member having a parti-circular shoulder at each longitudinal edge of the shank adjacent the rear edge of the head and also having a wing-receiving notch in each shoulder which notch comprises an enlarged opening communicating with a substantially straight entrance slot extending from the rear edge of the head forwardly therein and toward the center line of the body member, and a flat wing associated with each longitudinal edge of the shank, each of said wings being thrust into a notch through an entrance slot and having an opening receiving the associated parti-circular shoulder whereby each wing is pivotable within a notch from a position engaging a longitudinal edge of the shank to a position engaging the rear edge of the head.

2. A hook-setting device adapted to be connected in a fishing line in spaced relationship to the bait and comprising in combination, a flat generally arrow-shaped body member including a shank and a head pointing away from the bait, the said body member having a parti-circular shoulder at each longitudinal edge of the shank adjacent the rear edge of the head and also having a wing-receiving notch in each shoulder which notch comprises a generally circular opening having a substantially straight entrance slot extending from the rear edge of the head forwardly therein and toward the center line of the body member to join said generally circular opening substantially tangentially thereof, and a flat wing associated with each longitudinal edge of the shank, each of said wings being thrust into a notch through the entrance slot and having an opening to receive the associated parti-circular shoulder whereby each wing is pivotable within the notch from a position engaging a longitudinal edge of the shank to a position engaging the rear edge of the head.

3. A hook-setting device adapted to be connected in a fishing line in spaced relationship to the bait and comprising in combination, a flat generally arrow-shaped body member including a shank and a head pointing away from the bait, the said body member having a parti-circular shoulder at each longitudinal edge of the shank adjacent the rear edge of the head and also having a wing-receiving notch in each shoulder which notch comprises a generally circular opening which is substantially concentric with the parti-circular shoulder and having its center disposed substantially at the point of intersection of the lines of the longitudinal edge of the shank and the rear edge of the head and which notch also comprises a substantially straight entrance slot extending from the rear edge of the head forwardly therein and toward the center line of the body member to join said circular opening substantially tangentially thereof, and a flat wing associated with each longitudinal edge of the shank, each of said wings being thrust into a notch through the entrance slot and having a generally rectangular opening receiving the associated parti-circular shoulder whereby each wing is pivotable within the circular opening of the notch from a position engaging a longitudinal edge of the shank to a position engaging the rear edge of the head.

No references cited.